Figure 1:
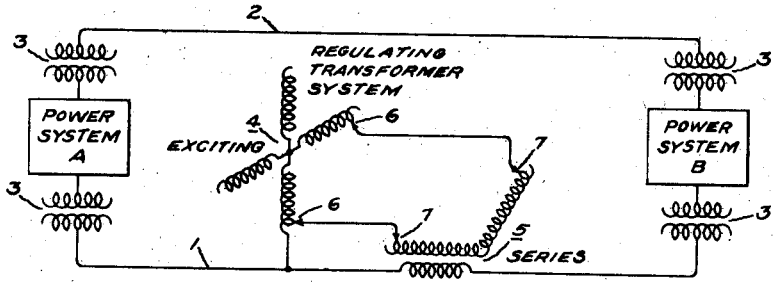

April 2, 1940.	Z. O. ST. PALLEY	2,196,029
ELECTRIC CIRCUIT
Filed Aug. 11, 1937	3 Sheets-Sheet 1

REGULATING VOLTAGE
IN PHASE WITH
EXCITING (SYSTEM A)
VOLTAGE

REGULATING VOLTAGE
LAGGING EXCITING
(SYSTEM A) VOLTAGE
BY 30°

REGULATING VOLTAGE
LEADING EXCITING
(SYSTEM A) VOLTAGE
BY 30°

Inventor:
Zoltan O. St. Palley,
by Harry E. Dunham
His Attorney.

Inventor:
Zoltan O. St. Palley
by Harry E. Dunham
His Attorney.

Patented Apr. 2, 1940

2,196,029

UNITED STATES PATENT OFFICE 2,196,029

ELECTRIC CIRCUIT

Zoltan O. St. Palley, Pittsfield, Mass., assignor to General Electric Company, a corporation of New York Application August 11, 1937, Serial No. 158,535

20 Claims. (Cl. 172—238)

My invention relates to electric circuits, and more particularly to a new and improved transformer voltage regulating system.

It is often desirable to be able to adjust or regulate both the magnitude and phase of an alternating voltage. For example, in alternating current power transmission and distribution systems so-called loop circuits are often completed by circuits known as tie lines. These loop circuits in effect provide two or more parallel paths for current to flow in from a source of supply to a load. By inserting a series regulating voltage in one of these parallel paths or tie lines, the distribution or ratio of the real power in watts or the reactive power in reactive voltamperes, or both, between the two paths can be varied by varying the magnitude or the phase angle or both of the series regulating voltage.

Heretofore, in most commercial voltage regulating transformer systems for securing magnitude and phase angle control by tap changing under load the operation may be likened to rectangular coordinate control in that the regulating voltage is the resultant of two quadrature components which are selectively adjustable.

In accordance with my invention, I provide a transformer tap-changing under load system in which the operation may be likened to polar coordinate control instead of rectangular coordinate control because the desired regulating voltage is secured by selectively adjusting its magnitude in one or more steps and independently selectively adjusting its phase angle in one or more steps. My invention is particularly well adapted for use in high voltage, large power transmitting circuits and it has high apparatus economy in that no more than two polyphase transformer cores are required. In addition all of the tap changing may be done in exciting circuits for the regulating transformer system so that if the system is designed to produce a regulating voltage which is but a fraction of the total circuit voltage the maximum voltamperes which the tap-changing means is called upon to make and break will also be but a fraction of the total volt-amperes of the main circuit.

My polar coordinate type of control is of particular advantage in systems where it is desired to operate a tie line at constant power factor. By adjusting the phase of the regulating voltage to the proper angle, variations in magnitude of the voltage along this angle will cause both the watts and reactive volt-amperes of the tie line to change in such proportion that the power factor of the tie line remains constant. This is often a very desirable form of tie line operation.

An object of my invention is to provide a new and improved electric circuit.

A further object of my invention is to provide a new and improved voltage phase angle regulating and voltage magnitude regulating load ratio control transformer system.

An additional object of my invention is to provide a simple and economical voltage magnitude and phase angle regulating transformer system adapted for use in high voltage circuits.

My invention will be better understood from the following description taken in connection with the accompanying drawings and its scope will be pointed out in the appended claims.

Figure 2:
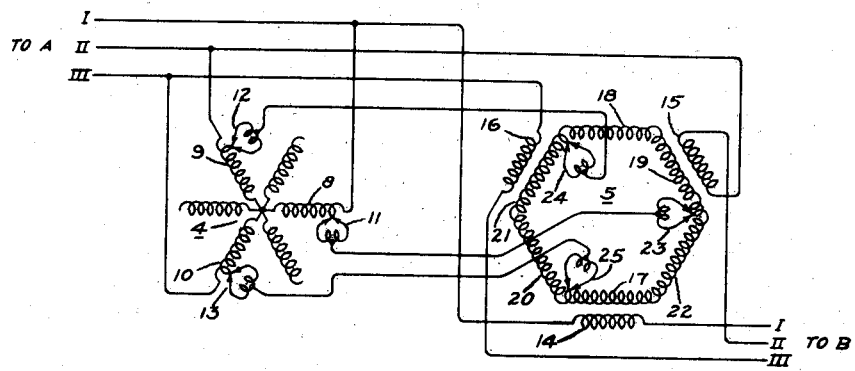
Figure 3:
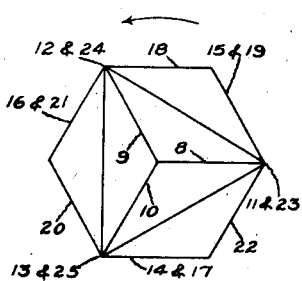
Figure 4:
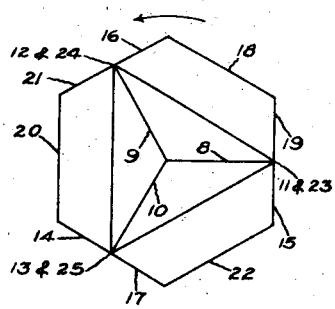
Figure 5:
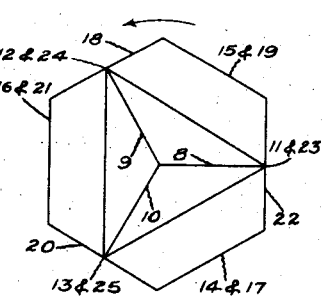
Figure 6:
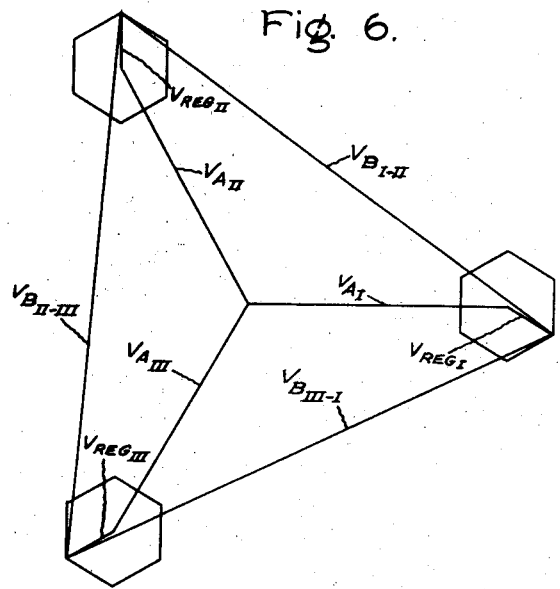
Figure 8:
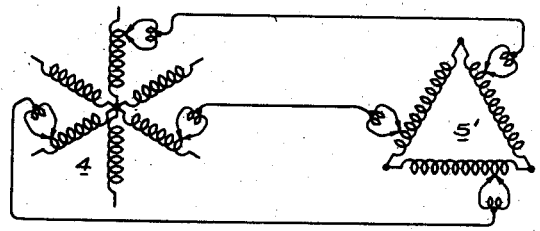
Figure 9:
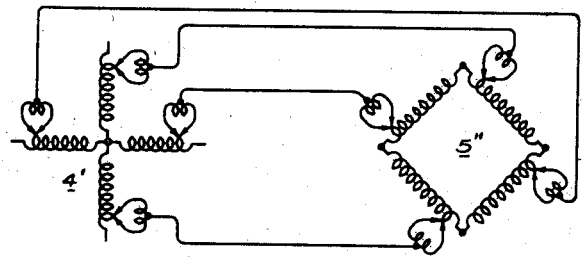
Figure 7:
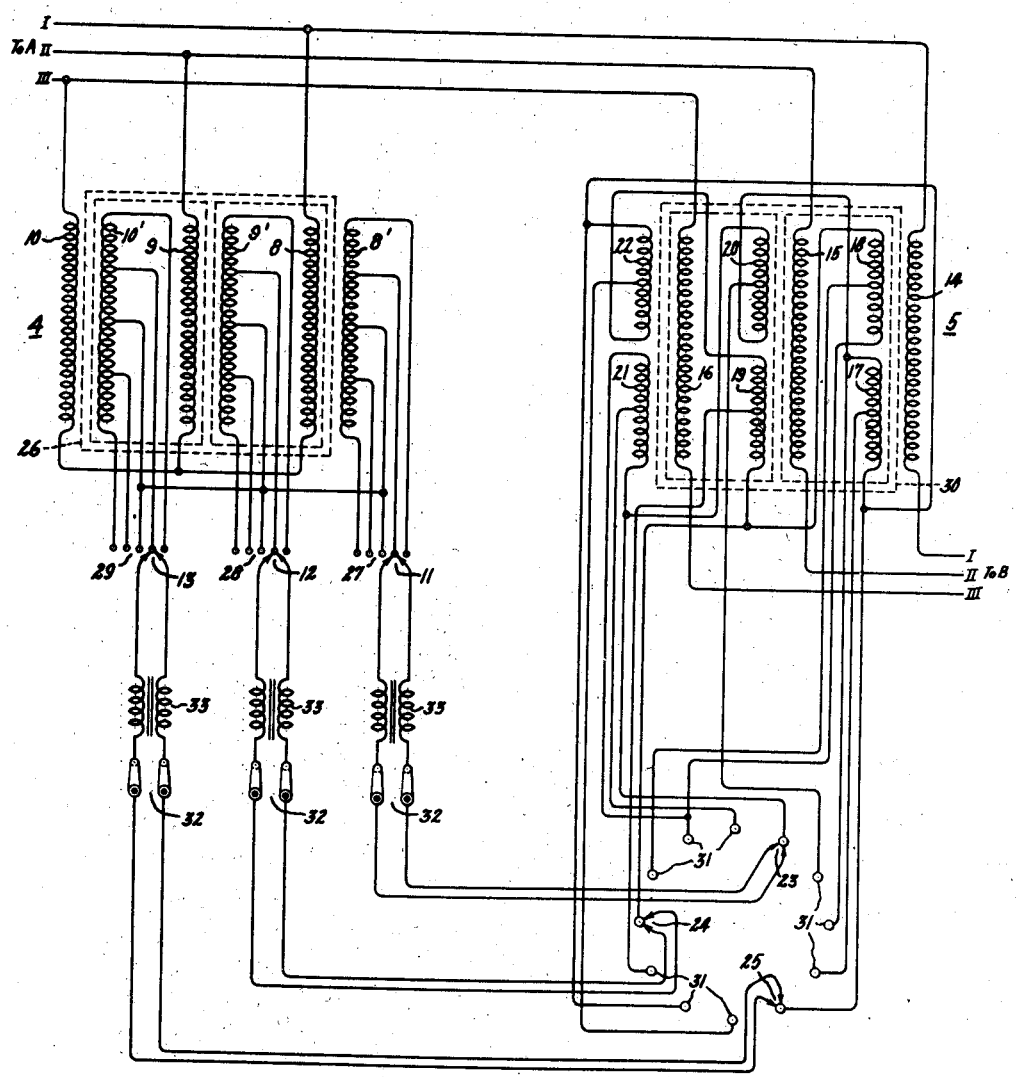

In the drawings, Fig. 1 is a schematic one-line diagram of an electrical power system in which my invention is adapted to be used; Fig. 2 is a diagrammatic showing of an embodiment of my invention; Figs. 3, 4 and 5 are vector diagrams showing the phase relations between the exciting and regulating voltages of the system of Fig. 2 for explaining the phase angle control aspect of the operation thereof; Fig. 6 is a vector diagram showing the relation of the line voltages on each side of the regulating transformer system which is produced by the regulating voltage of the transformer system of Fig. 2; Fig. 7 shows more or less diagrammatically the physical relations of the transformer windings of a modification of Fig. 2 and Figs. 8 and 9 show diagrammatically additional modifications.

Referring now to the drawings and more particularly to Fig. 1, there is shown therein schematically a power system A and a power system B interconnected by means of two high voltage power circuits or transmission lines 1 and 2 having at each of their ends high voltage power transformers 3, as is common practice. Connected to tie line 1 is a regulating transformer system shown schematically single phase for the sake of clarity and consisting of an exciting transformer 4 connected to respond to the voltage of the tie line 1 and a series transformer 5 which receives its excitation from the exciting transformer 4. As will be explained more clearly in connection with Fig. 2, tap-changing means 6 are provided on the exciting transformer for securing therefrom an adjustable magnitude constant phase voltage and tap-changing means 7 are provided on series transformer 5 for varying the application of the output voltage of the exciting transformer 4 to the series transformer 5 in such a way as to produce a phase shift in the series regulating voltage produced by the series transformer 5 in the tie line 1 without substantially changing the magnitude of this regulating voltage.

In Fig. 2 a section of the tie line 1 is shown three phase as consisting of the conductors I, II and III. The exciting transformed 4 is shown as a star-connected autotransformer having phase windings 8, 9 and 10 connected respectively to the conductors I, II and III. These windings are extended beyond the neutral so as to be able to secure reverse or negative magnitude voltages therefrom. If desired, these three windings may be taken to represent a bank of three single phase autotransformers rather than a single three phase transformer.

Separate tap-changing means 11, 12 and 13 are arranged for changing taps on windings 8, 9 and 10 respectively. These tap-changing means may be of any well-known type and as shown are of the two contact finger type, the two contact fingers being connected to the ends of a mid-tap preventive reactor. During normal operation both contact fingers are on the same tap so that the two halves of each reactor carry equal and opposite currents thereby preventing the formation of any flux and hence offering minimum reactance to current flow through the tap-changing means. During a tap-changing operation one contact finger is first moved to an adjacent tap and then the other contact finger is moved to the new tap. During the transition, any circulating current caused by the difference in tap voltage across which the two contact fingers are connected will be limited by the reactance of the reactor. By moving the three tap-changing means in and out on the windings, in equal steps, a balanced, variable magnitude, constant phase, three phase voltage is obtained from the exciting transformer 4.

The series transformer 5 is shown as consisting of a mesh-connected primary winding and a secondary having three windings 14, 15 and 16 connected respectively in the conductors I, II and III. The mesh-connected primary winding is shown as a hexagon although theoretically it may be any mesh-connected winding and it is not necessary that its individual windings be equal as shown. However, it is preferable that the winding have at least six sides and that the sides be equal because the nearer the vector voltages of the individual primary windings come to forming a circle the less will be the change in voltage magnitude accompanying a change in phase angle of the regulating voltage. This will be explained more fully later.

The primary windings for secondary winding 14 are windings 17 and 18, the primary windings for secondary winding 15 are windings 19 and 20 and the primary windings for secondary winding 16 are windings 21 and 22.

The mesh-connected primary winding is provided with three tap-changers 23, 24 and 25 which are similar to and connected respectively to the tap-changers 11, 12 and 13 on the exciting transformer 4. For a mesh-connected primary winding having equal sides, the tap-changers 23, 24 and 25 should be symmetrically located on the mesh.

The operation of Fig. 2 can best be understood by reference to the vector diagrams shown in Figs. 3, 4 and 5. In these diagrams the vector voltages of the windings are given the same numerals as the windings which produce them, and in addition the locations of the tap-changers are shown thereon by the numbers of the tap-changers themselves. Fig. 3 illustrates the voltage relations existing with the connections and tap positions as shown in Fig. 2 when the left hand end of the tie line in Fig. 2 is energized by a balanced three-phase voltage. The three vectors 8, 9 and 10 radiating from the center or neutral point are the voltages of the windings 8, 9 and 10 of the exciting transformer and also of course are the line to neutral voltages of the conductors I, II and III which are connected to system A. These three vectors are not shown extended beyond the neutral point in the opposite directions as is actually the case by reason of the extension of the windings beyond the neutral. This has been omitted from the vector diagram to avoid unnecessarily complicating it. The triangle represents the voltage between tap changers and may also be taken to represent the line to line voltage of the tie line 1 on the exciting side of the transformer system. The hexagon of course represents the voltages of the six windings constituting the primary of the series transformer 5.

It will be noted that the vector voltages of the series secondary windings 14, 15 and 16 of the series transformer are in phase respectively with the line to neutral voltages 8, 9 and 10 of the conductors I. II and III and that consequently with the tap-changers in the positions shown in Fig. 2, no phase shift is produced by the regulating transformer system.

If taps 11, 12 and 13 are moved inwardly or outwardly by corresponding amounts on their respective windings, the effect will be to contract or expand the entire diagram of Fig. 3 while maintaining the exact relative proportions of the vectors shown in the figure. In this way magnitude control of the regulating voltage inserted by the series windings 14, 15 and 16 is readily secured.

If now the tap-changers 23, 24 and 25 are moved through equal clockwise angles or through equal counterclockwise angles, the phase angle of the regulating voltage with respect to the exciting voltage can be varied at will through any angle desired. As can be seen more clearly from Figs. 4 and 5 rotating the tap-changers 23, 24 and 25 counterclockwise is vectorially equivalent to rotating the hexagon through the same angle in a clockwise direction and similarly rotating the tap-changers 23, 24 and 25 clockwise results in effect in a rotation of the vector hexagon through the same angle in a counterclockwise direction. Fig. 4 represents conditions when the tap-changers 23, 24 and 25 have been rotated through an angle of thirty electrical degrees in a counterclockwise direction and as can be seen in the vector diagram, this causes the hexagon to rotate thirty electrical degrees in a clockwise direction with respect to the exciting voltages. Assuming the conventional direction of counterclockwise for vector rotation, this means that the regulating voltage has been made to lag the exciting voltage by thirty degrees or by an angle corresponding to the electrical angle through which the tap-changers 23, 24 and 25 have been rotated in the opposite direction. In Fig. 5 the vector diagrams represent conditions when the tap changers 23, 24 and 25 have been rotated clockwise through an angle of thirty electrical degrees causing the regulating voltages to lead their exciting voltages by the same angle.

A comparison of Fig. 3 on the one hand and Figs. 4 and 5 on the other shows that for a constant exciting voltage the rotation of the phase angle taps 23, 24 and 25 through an angle of thirty electrical degrees in either direction from that shown in Figs. 2 and 3 causes the maximum change in magnitude of the regulating voltage for an equilateral hexagon series transformer primary. However, this change even with a six winding primary is a relatively few percent of the regulating voltage in either position of the phase angle tap-changers. It may happen that for some operating conditions this small change is not tolerable, in which case a series transformer having a greater number of phase windings in its primary may be used. The greater the number of sides of the equilateral vector polygon, the nearer it comes to being a circle and consequently the less change in regulating voltage magnitude will accompany any given change in phase angle of the regulating voltage. It is obviously a relatively simple matter to provide the series transformer with as many primary sections as desirable.

Fig. 6 shows the vector relation between the tie line voltages on both sides of the regulating transformer system. For the sake of clarity, the line voltages on the system A side of the transformer system are shown as line to neutral voltages, while the line voltages on the system B side of the transformer system are shown as line to line voltages. The regulating voltage is the same as that shown for Fig. 4 wherein it lags the system A line to neutral voltage by thirty electrical degrees.

While the series transformer 5 has been spoken of as a three-phase transformer, it may obviously just as well be composed of a bank of three three-winding single phase transformers connected as shown in Fig. 2. That is to say windings 14, 17 and 18 would constitute one single phase transformer, windings 15, 19 and 20 would constitute another single phase transformer and windings 16, 21 and 22 would constitute the remaining single phase transformer.

By means of the system shown in Fig. 2, it is possible to set the angle changing tap-changers 23, 24 and 25 for a given phase angle such that merely changing the magnitude tap-changers 11, 12 and 13 will permit changing the power flow in the tie line 1 at constant power factor. This greatly simplifies the operation as constant power factor operation can be secured by adjusting but a single set of tap-changers instead of correlating the settings of two separate tap-changers as has been done heretofore.

Sometimes a desired large phase angle change in voltage results in a rather heavy volt-ampere duty on the phase angle adjusting tap-changing contactors or switches. This can easily be avoided by placing the magnitude tap-changers 11, 12 and 13 on the neutral point of the exciting transformer and then rotating the phase angle adjusting tap-changers. These tap-changers will then be operated at no voltage.

In the modification shown in Fig. 7, the exciting transformer 4 is a straight or insulating transformer in which the primary windings are given the same reference numerals as the windings of the autotransformer in Fig. 2 and the secondary windings are given corresponding primed reference numerals. A common core 26 is shown by dotted lines and the windings 8 and 8' are wound on one leg of the core, the windings 9 and 9' are wound on another leg and the windings 10 and 10' are wound on the remaining leg of the three-legged core. Tapped portions of the secondary windings 8', 9', and 10' are connected to sets of tap contacts 27, 28 and 29 respectively over which the tap changers 11, 12 and 13 are adapted to move. Similarly, the series transformer 5 is shown as a three phase transformer wound on a three-legged core 30. The windings 14, 17 and 18 are wound on one leg, the windings 15, 19 and 20 are wound on another leg and the windings 16, 21 and 22 are wound on the remaining leg. The ends of the primary windings 17-22 inclusive and the mid points of each of these windings are brought out to sets of tap contacts 31 around which the phase angle tap-changers 23, 24 and 25 are adapted to move. With this arrangement the phase angle of the regulating voltage may be changed in thirty degree steps but by increasing the number of taps and tap contacts, the phase angle may be changed in any number of smaller angle steps if desired.

The arrangement of Fig. 7 is adapted for use in very large and high voltage power systems in which it is desirable to separate the tap-changing switches from the current interrupting contacts or contactors. To this end common contactors 32 are inserted between each magnitude changing tap-changer and its corresponding phase angle changing tap-changer. In addition, common preventive reactors 33 are provided for each magnitude changing tap-changer and its corresponding phase angle changing tap-changer. These reactors consist merely of equal turns wound on a magnetic core and connected in opposition so that they are normally electromagnetically balanced and offer minimum reactance to current flow therethrough.

The operation of Fig. 7 is generally the same as Fig. 2 except that when it is desired to make either a magnitude voltage change or a phase angle voltage change one contact, say the right hand contact of each of the contactors 32 is first opened and then the movable contact of whichever tap-changer it is desired to operate and which is in circuit with the open contactor is moved to the next adjacent tap, whereupon the open contactor is closed and the other contact of the contactor is opened and then the remaining tap-changer contact is moved to the tap to which the first tap-changer contact has been moved and finally the open contact of the contactors is closed. In this manner, one set of current interrupting contactors and current limiting reactors serves for the heavy duty current making and breaking operation during tap-changing for either magnitude voltage changing or phase angle voltage adjusting. If desired the contactors 32 may selectively be interlocked with either the magnitude changing tap-changers or the phase angle changing tap-changers by any suitable conventional interlocking load ratio control mechanism.

In Fig. 8, a modification is shown wherein the primary winding of the series transformer 5 is shown as a delta or triangular mesh 5'. Such an arrangement is simpler than that of Figs. 2 and 7 but results in greater magnitude voltage changes accompanying phase angle changes.

In Fig. 9, there is illustrated a two phase modification in which a two phase exciting transformer 4' has tap-changers connected to tap-changers on a two phase square type of mesh primary for a series transformer 5''.

While I have shown and described particular embodiments of my invention, it will be obvious to those skilled in the art that changes and modifications may be made therein without departing from my invention and consequently I aim in the appended claims to cover all such changes and modifications as fall within the true spirit and scope of my invention.

What I claim as new and desire to secure by Letters Patent of the United States, is:

1. A load ratio control transformer system, comprising, in combination, a transformer provided with taps, tap-changing means cooperating with said taps for changing under load the input-output ratio of said transformer while maintaining the relative phase angle of said voltages constant, a second transformer provided with taps, tap-changing means for changing under load over a relatively wire range the phase angle relation between the input-output voltages of said second transformer while maintaining the ratio of said voltages of said second transformer substantially constant, and direct electrical connections between said two tap-changing means.

2. A transformer system comprising, in combination, an exciting transformer having a star-connected winding, a series transformer having a mesh-connected winding, means for obtaining a variable magnitude balanced polyphase voltage from said star-connected winding, and means for selectively applying said voltage to a plurality of sets of points on said mesh-connected winding.

3. A transformer system comprising, in combination, an exciting transformer having a star-connected winding, a series transformer having a mesh-connected winding, means for obtaining a variable magnitude balanced polyphase voltage from said star-connected winding, and means for selectively applying said voltage to a plurality of electrically symmetrically located points on said mesh-connected winding.

4. In combination, a pair of alternating current power systems adapted for interconnected operation, a tie line for interconnecting said systems, relatively stationary winding transformer means for inserting a voltage in said tie line at such a phase angle with respect to the voltage of said tie line that variations in the magnitude of said inserted voltage change both the real power and reactive power transmitted by said line in a given ratio, unitary means for varying under load the magnitude of said inserted voltage so as to vary at constant power factor the power transmitted by said tie line, and unitary means for adjusting under load the angle of said inserted voltage substantially independently of its magniture so as to vary the power factor of said tie line.

5. In combination, a pair of alternating current power systems adapted for interconnected operation, a tie line for interconnecting said systems, relatively stationary winding transformer means for inserting a series voltage in said tie line, means for varying at constant phase angle the magnitude of said voltage, and means for varying at substantially constant magnitude the phase angle of said voltage over a substantially wide range.

6. In combination, a pair of alternating current power systems adapted for interconnected operation, a tie line for interconnecting said systems, transformer means for inserting a series voltage in said tie line, tap-changing means for varying at constant phase angle the magnitude of said voltage, and means for varying at substantially constant magnitude the phase angle of said voltage over a substantially wide range.

7. In combination, a pair of alternating current power systems adapted for interconnected operation, a tie line for interconnecting said systems, transformer means for inserting a series voltage in said tie line, means for varying at constant phase angle the magnitude of said voltage, and tap-changing means for varying at substantially constant magnitude the phase angle of said voltage over a substantially wide range.

8. In combination, a pair of alternating current power systems adapted for interconnected operation, a tie line for interconnecting said systems, relatively stationary winding transformer means for inserting a single series voltage per phase in said tie line, tap-changing means for varying at constant phase angle the magnitude of said voltage, and tap-changing means for varying at substantially constant magnitude the phase angle of said voltage over a substantially wide range.

9. In combination, a polyphase transformer having a mesh-connected winding the vector voltages of which form an equilateral polygon of at least sixe sides when said winding is excited by a symmetrically applied balanced polyphase voltage, a polyphase exciting circuit for said winding having a like number of phases, and an adjustable tap-changing means on said winding for applying the polyphase voltage of said circuit selectively to different sets of electrically symmetrically located points on said winding while maintaining the same number of total active turns in the mesh connection of said winding whereby the phase angle between the phase voltages of said circuit and winding is varied over a relatively wide range without substantially varying the ratio of the magnitudes of said phase voltages.

10. In combination, a polyphase transformer having a mesh-connected primary winding the vector voltages of which form an equilateral polygon of at least six sides when said winding is excited by a symmetrically applied balanced polyphase voltage, a polyphase exciting circuit for said winding having a like number of phases, an adjustable tap-changing means on said winding for applying the polyphase voltage of said circuit selectively to different sets of electrically symmetrically located points on said winding while maintaining the same number of total active turns in the mesh connection formed by said winding whereby the phase angle between the phase voltages of said circuit and winding is varied over a relatively wide range without substantially varying the magnitude of said phase voltages, and means for varying the magnitude of the phase voltages of said circuit.

11. In combination, a tie line for interconnecting a pair of alternating current power systems, a relatively stationary winding transformer means for inserting a single series voltage per phase in said tie line, and a single tap-changing means per phase on said transformer means for varying under load at substantially constant magnitude the phase angle of said voltage over a substantially wide range.

12. A transformer system comprising, in combination, a mesh-connected primary winding, means for producing a polyphase alternating exciting voltage for said winding, and means for adjustably applying said voltage to different sets of spaced points on said winding while maintaining constant the number of active turns in the mesh connection formed by said winding.

13. A transformer system comprising, in combination, a mesh-connected winding, means for applying a polyphase voltage to spaced points on said winding, means for inductively deriving a polyphase voltage from said mesh-connected winding, and means for adjustably varying the relative phase angle between said polyphase voltages by shifting the points of application of said applied polyphase voltage to said spaced points on said winding.

14. In combination, a three phase series transformer having a secondary winding adapted to be connected in series in an electric power system and having a primary winding the vector voltages of which normally form an equilateral hexagon, means for exciting said primary winding with a three phase voltage applied to three electrically symmetrically spaced points on said primary winding, and means for changing under load the location of said points thereby in effect to rotate said vector voltage hexagon and change the phase angle between said exciting voltage and the voltage of said secondary winding.

15. In a tap-changing-under-load transformer system, an electric circuit, a pair of transformers connected thereto, separate tap-changing means for each of said transformers, said tap-changing means being adapted to change taps while maintaining transformer current flow therethrough, and a common set of current interrupting contactors serially connected with each of said tap-changing means.

16. In a tap-changing-under-load transformer system, an electric circuit, a pair of transformers connected thereto, separate tap-changing means for each of said transformers, said tap changing means being adapted to change taps while maintaining current flow therethrough, and a common set of preventive reactances serially connected with each of said tap-changing means.

17. In a tap-changing-under-load transformer system, an electric circuit, a pair of transformers connected thereto, separate tap-changing means for each of said transformers, said tap-changing means being adapted to change taps while maintaining transformer current flow therethrough, a common set of current interrupting contactors serially connected with each of said tap-changers, and a common set of preventive reactors serially connected with each of said tap-changing means.

18. In a transformer system for inserting an adjustable series voltage in an electric power system tie line, in combination, an exciting transformer having tap changing means for producing a constant phase angle variable magnitude voltage, a series transformer having tap changing means for producing a substantially constant magnitude variable phase angle voltage, and means including a common set of current interrupting contactors for interconnecting said two tap-changing means, and common preventive reactors for said two tap-changing means.

19. In a transformer system for inserting an adjustable series voltage in an electric power system tie line, in combination, an exciting transformer having tap-changing means for producing a constant phase angle variable magnitude voltage, a series transformer having tap changing means for producing a substantially constant magnitude variable phase angle voltage, and common preventive reactors for said two sets of tap-changing means.

20. In a transformer system for inserting an adjustable series voltage in an electric power system tie line, in combination, an exciting transformer having tap-changing means for producing a constant phase angle variable magnitude voltage, a series transformer having tap-changing means for producing a substantially constant magnitude variable phase angle voltage, means including a common set of current interrupting contactors for interconnecting said two tap-changing means, and common preventive reactors for said two tap-changing means.

ZOLTAN O. ST. PALLEY.